(12) United States Patent
Pfundstein (10) Patent No.: US 10,723,287 B2
(45) Date of Patent: Jul. 28, 2020

(54) RETROREFLECTIVE BODY WITH COLOR EFFECT AND PRODUCTION METHOD

(71) Applicant: ERICH UTSCH AG, Siegen (DE)

(72) Inventor: Bernd Pfundstein, Ehringhausen (DE)

(73) Assignee: ERICH UTSCH AG, Siegen (DE)

( * ) Notice: Subject to any disclaimer, the term of this patent is extended or adjusted under 35 U.S.C. 154(b) by 0 days.

(21) Appl. No.: 15/770,679

(22) PCT Filed: Nov. 4, 2016

(86) PCT No.: PCT/EP2016/076673
§ 371 (c)(1),
(2) Date: Apr. 24, 2018

(87) PCT Pub. No.: WO2017/077033
PCT Pub. Date: May 11, 2017

(65) Prior Publication Data
US 2019/0054867 A1 Feb. 21, 2019

(30) Foreign Application Priority Data
Nov. 5, 2015 (DE) .......................... 10 2015 118 966

(51) Int. Cl.
*B60R 13/10* (2006.01)
*G02B 5/128* (2006.01)

(52) U.S. Cl.
CPC .............. *B60R 13/10* (2013.01); *G02B 5/128* (2013.01)

(58) Field of Classification Search
CPC ................................ B60R 13/10; G02B 5/128
See application file for complete search history.

(56) References Cited

U.S. PATENT DOCUMENTS

| | | | |
|---|---|---|---|
| 2,713,286 A | 7/1955 | Taylor | |
| 3,190,178 A | 6/1965 | McKenzie | |
| 3,310,900 A | 3/1967 | Hamilton et al. | |
| 4,123,140 A | 10/1978 | Ryan et al. | |
| 4,650,283 A | 3/1987 | Orensteen | |
| 5,988,821 A | 11/1999 | Tanaka et al. | |
| 2003/0003254 A1 | 1/2003 | Levenstein | |
| 2009/0097114 A1 | 4/2009 | Mimura et al. | |
| 2012/0200919 A1* | 8/2012 | Petaja | G02B 5/0247 359/483.01 |

FOREIGN PATENT DOCUMENTS

| | | |
|---|---|---|
| DE | 69530963 T2 | 5/2004 |
| EP | 0704719 A2 | 4/1996 |
| WO | 2014209607 A1 | 12/2014 |

OTHER PUBLICATIONS

International Search Report dated Mar. 1, 2017 re: Application No. PCT/EP20161076673; pp. 1-3; citing: U.S. Pat. No. 2,713,286 A, WO 2014/209607 A1, U.S. Pat. No. 4,123,140 A, EP 0 704 719 A2, U.S. Pat. No. 3,190,178 A and U.S. Pat. No. 3,310,900 A.

* cited by examiner

*Primary Examiner* — Nathan L Van Sell
(74) *Attorney, Agent, or Firm* — Cantor Colburn LLP (57) ABSTRACT

A retro-reflective body with an optically perceptible feature includes a substrate on whose upper side a binder layer is disposed. A plurality of transparent elements is at least partially embedded into the binder layer in such a way that light can enter the transparent elements. The surface of the transparent elements is configured as a spherical segment at least in some portions and wherein the spherical segments of the transparent elements are embedded into the binder layer and are orientated towards the upper side of the substrate. The retro-reflective body has a first partial region which a first share of the transparent elements, in each case with the spherical sections, is adjacent at least in some portions to spaces -filled with an optically thinner medium or a vacuum, wherein the optically perceptible feature is formed by the first partial region.

30 Claims, 6 Drawing Sheets

RETROREFLECTIVE BODY WITH COLOR EFFECT AND PRODUCTION METHOD

TECHNICAL FIELD

The disclosure relates to a retro-reflective body, a method for producing a retro-reflective body, a use of a retro-reflective body as a vehicle number plate and/or a traffic sign and a method for producing a vehicle number plate and/or a traffic sign.

BACKGROUND

Vehicle number plates with a panel onto whose front a retro-reflective film is laminated have long been known. The use of retro-reflective films for vehicle number plates or information signs is required in a multitude of countries by their respective national registration regulations. Due to their retro-reflectivity, retro-reflective number plates or information signs are highly visible under retro-reflective conditions.

Provisions for retro-reflective materials for traffic safety and photometric requirements for reflective substances are laid down, for example, in DIN 67520. Here, retro-reflective materials are classified according to the luminance that a road user perceives from an observed traffic sign. In this case, the construction of the observed retro-reflective structures is irrelevant. In this case, the reflection classes (RA classes) describe the minimum requirements for a material with respect to a specific reflective value.

The requirements for reflective substances for vehicle number plates and traffic signs have increased in recent years. Furthermore, it is presumed that these requirements are raised further in the future. Here, the decreasing visual acuity of a growing number of older drivers figures prominently, the necessity that traffic signs have to be recognizable in the increased urban ambient brightness, and the rise in overhead installations of signs that can hardly be reached anymore by the focused light beam of modern vehicle headlights. These are but a few examples that are supposed to show that the requirements for reflection films used in future have a great need for high-performance retro-reflective layers, as well as a need for large areas of application.

Based on their photometric properties, reflective films are divided into various reflection classes. They are characteristic for the requirements with respect to the specific reflective value (RA), which is a determining factor in the selection of the reflective film. Depending on the different designs, a distinction is made between different types with respect to the reflective film structure.

Some types of reflective films in this case comprise a reflective base layer and glass spheres. In this case, a transparent intermediate layer is provided between the reflective layer and the glass spheres, so that the spheres act as thick lenses and a light beam incident upon the sphere is refracted such that its focus is situated just behind the sphere, substantially on the reflective layer. Thus, light is more or less reflected back to the light source.

Other types of reflective film constitute a more intensively retro-reflective film based on encapsulated glass spheres. In this case, a reflective layer is directly adjacent, in one area, to the glass spheres.

Still other types of reflective film have a reflective layer within the film, based on micro-prism technology. In the case of these films, a layer with a prismatic structure is applied to a substrate layer which, towards the reflective side, is also coated with a cover layer.

It is furthermore known from prior art that, in the case of road markings, very fine glass spheres are applied to the still-moist white marking paint and partially embedded therein. An improved reflection in the case of irradiation is thus obtained in order to increase the visibility of the markings if irradiated.

It is also known that an internal total reflection provides a largely loss-free reflection, so that very high reflective values are achieved by means of this effect. Due to the occurrence of this effect in the interior of a transparent body at the interface with a different, optically thinner medium, it is not necessary to separately provide or manufacture any mirror surfaces. Further more, the problem that the reflectance of the mirror surfaces can be affected by external influences, such as dirt, does not arise.

Furthermore, security features, e.g. in the form of image markings, are known from the prior art. Security features are characteristic properties that prove the authenticity of an item and make falsification impossible, or at least render it considerably more difficult. Such security features are often applied to the items to be marked in the form of optically perceptible image markings, e.g. watermarks or holograms. Providing and manufacturing such security features frequently requires much effort, so that there is generally a need for providing reliable security features whose structure and manufacture are simple and cost-effective.

SUMMARY

The present disclosure therefore provides an improved variant of a retro-reflective body with an optically perceptible feature. The present disclosure also provides an improved variant of a retro-reflective vehicle number plate or traffic sign and an improved retro-reflective film with an optically perceptible feature.

This is achieved by providing a retro-reflective body having the features of claim 1, a method having the features of claim 18, a use of the retro-reflective body as a vehicle number plate and/or traffic sign having the features of claim 33, and a method for producing a vehicle number plate and/or traffic sign with the features of claim 34. Advantageous further embodiments are in each case specified in the dependent claims. In this case, all combinations and even only individual combinations of the retro-reflective body, the method for producing the retro-reflective body, the use and the method for producing a vehicle number plate and/or traffic sign may be used together. Furthermore, it is also provided and possible in each case to combine in any manner individual or several features of the retro-reflective body, the methods and the uses.

According to the disclosure, a retro-reflective body with an optically perceptible feature is proposed which comprises a substrate onto whose upper side a binder layer is disposed. A plurality of transparent elements is at least partially embedded into the binder layer in such a way that light can enter the transparent elements, wherein the surface of the transparent elements is configured as a spherical segment at least in some portions. Moreover, the spherical segments of the transparent elements are embedded into the binder layer and are orientated towards the upper side of the substrate. In this case, the retro-reflective body has a first partial region in which a first share of the transparent elements, in each case with the spherical sections, is adjacent at least in some portions to spaces filled with a substantially optically thinner medium, such as gas or a vacuum, wherein the optically perceptible feature is formed by the first partial region.

In this case, "optically thinner" relates to the material of the transparent elements.

In this connection, substrate means a body which preferably has a flat configuration. Furthermore, the above may mean an arbitrary layer that is suitable for a binder layer with the above-mentioned transparent elements to be arranged on it. In this context, the upper side of the substrate describes the side of the substrate facing towards an incidence of light and on which the binder layer with the above-described transparent elements is disposed. Furthermore, the substrate may also have other sides, such as a lower side or peripheral sides not orientated towards the incidence of light.

In this context, an optically perceptible feature describes a characteristic light or reflective effect, which, in a preferred exemplary embodiment, includes a color effect. In this case, in a particularly preferred exemplary embodiment, the first partial region differs from the rest of the region of the retro-reflective body in that the first partial region reflects light in a manner different to the rest of the region. In this case, it is particularly preferred that, in the event of irradiation with light, the first partial region reflects this light with a characteristic color effect. The result of this is that the first partial region, to the observer, forms the above-mentioned optically perceptible feature. In a preferred exemplary embodiment, the optically perceptible feature substantially has the form of the first partial region.

Furthermore, it is provided that other regions of the retro-reflective body, e.g. a second partial region of the retro-reflective body, also reflect light. However, it is provided that the first partial region reflects light in a particularly distinctive and colored manner, so that the reflection of the first partial region differs from the reflection of the other regions, e.g. of the second region, and that the optically perceptible feature thus stands out to the observer. In this case, it may also be provided that the first partial region of the retro-reflective body reflects light in a colored manner, but does not retro-reflect. Thus, the angle of illumination may differ from the viewing angle for the first partial region. It is preferred that a color effect becomes visible when the retro-reflective body is illuminated obliquely, wherein the viewing angle at which the color effect is visible is unequal to the angle of illumination.

Surprisingly, it was found that a first partial region in which a first share of 10 to 90%, in each case with the spherical sections, is adjacent at least in some portions to spaces filled with an optically thinner medium or a vacuum, provides very advantageous reflective effects, with this first partial region then forming an optically perceptible feature. The reflective effects of an above-described first partial region with a space formation in 10 to 90% of the transparent elements differ significantly from the reflective effects of other regions with transparent elements without any substantial space formation on the transparent elements.

In a preferred exemplary embodiment, the first share of transparent elements in the first partial region is therefore preferably 10 to 90%. In another particularly preferred exemplary embodiment, the first share of the transparent elements with a space formation in the first partial region is 10 to 50%. In another, very particularly preferred example, the first share of the transparent elements with a space formation on the transparent elements in the first partial region is 20 to 30%.

Due to the configuration and arrangement of a first partial region within which a first share of the transparent elements is provided with a space formation as described above, the above mentioned special reflective effects, which differ from other regions, particularly a second partial region of a retro-reflective body, occur in that region. It is thus accomplished that a retro-reflective body is provided with a feature that stands out like a reflection. This distinct feature may then be perceived by an observer as the above-mentioned optically perceptible, special feature.

An optical effect thus occurs under light irradiation which has the first partial region reflect differently, with a distinct effect, than the other regions of the retro-reflective body. The reflective effects which surprisingly occur are particularly pronounced, colored reflective effects that differ from the other regions in the type of reflection. If the first partial region is configured as a character, writing or pattern, a certain feature or a marking in this form can thus be incorporated into the reflecting surface as an optically perceptible feature.

In another preferred exemplary embodiment, the retro-reflective body comprises a second partial region in which a second share of the transparent elements, at the spherical segments, is adjacent at least in some portions to a space filled with an optically thinner medium or a vacuum, wherein the second share is at most 50% of the first share, preferably at most 30% and particularly preferably at most 15%.

In order for the observer to see an optically perceptible feature, it is necessary that the region forming the optically perceptible feature stands apart from the other regions. It was found that a first region in which transparent elements are provided that are adjacent to a space filled with an optically thinner medium or vacuum and configured, for example, as a gap, differs from a second region in which considerably fewer transparent elements that are adjacent to a space filled with an optically thinner medium or vacuum are provided per surface area than in the first region. It is particularly preferred that the first partial region forming the optically perceptible feature has a considerably larger percentage of transparent elements with a space formation than the other regions, in particular the second partial region, so that these regions are sufficiently distinct from one another when subjected to an incidence of light.

In another preferred embodiment, it is provided that a reflective layer, to which the binder layer is adjacent, is disposed on the upper side of the substrate, wherein the binder layer is configured to be substantially transparent.

Further, it is particularly preferred that the reflective layer has a thin metallic layer, preferably comprising aluminum or silver.

In this case, the reflective layer may preferably be disposed between the upper side of the substrate and the binder layer. Here, a reflective side of the reflective layer is adjacent to the binder layer at least in some areas.

In another embodiment, it is preferred that the reflective layer has a reduced retro-reflectivity to no retro-reflectivity in the first region, compared with the second region. It is particularly preferred that the first partial region of the retro-reflective body reflects light in a colored manner, but does not retro-reflect, but that for the first partial region the illumination angle deviates from the viewing angle at which the color effect is visible. It is preferred that a color effect becomes visible in the first partial region when the retro-reflective body is illuminated obliquely, wherein the viewing angle at which the color effect is visible is unequal to the angle of illumination.

In a particularly preferred embodiment, it is provided that the spaces are formed between the transparent elements and the binder layer. In particular, it was found to be advantageous if these spaces are formed as gaps between the transparent elements and the binder layer.

According to the above description, the spaces are filled with a substantially optically thinner medium or a vacuum. Here, optically thinner medium is to be understood in relation to the material of the transparent elements. For example, the gap or space which is adjacent to a transparent element may in this case be filled with air or comprise a vacuum. The combination of the material of a transparent element with the space or gap can be chosen arbitrarily as long as the preconditions for light refraction on the interface of the transparent element are ensured for the space or gap.

Furthermore, it is particularly preferred that the transparent elements are configured for light refraction, so that light entering the transparent elements obliquely undergoes spectral decomposition.

In another embodiment, it is provided that the transparent elements are arranged next to one another substantially in a plane parallel to the upper side of the substrate.

Further, it is preferred that the transparent elements are substantially configured as spheres.

In another embodiment, it is provided that light incident upon the first partial region is reflected only partially. It is possible that only light of certain wavelengths is reflected. This gives rise to the effect that the first partial region appears in a certain color depending on which light wavelengths are reflected. In this case, it is conceivable that the effect arises due to light entering the transparent elements being at least partially refracted and then reflected in individual colors, so that the observer then perceives the different colors accordingly.

Furthermore, it is also possible that a reflective effect of the first partial region arises by internal total reflection occurring at least partially at the interface of the transparent element to the space. It may be provided that the transparent elements and the spaces filled with an optically thinner medium or vacuum are arranged such that incident light is at least partially reflected at the interfaces between the transparent elements and the spaces.

In another exemplary embodiment the retro-reflective body comprises a transparent coating disposed on the binder layer and/or the transparent elements.

In another preferred embodiment, the coating is colored.

External influences, such as temperature, moisture or corrosion, for example, may result in a change of the surface of the transparent elements and/or the binder layer. Thus, light may be inhibited from entering the binder layer and/or the interior of the transparent element, whereby a reflection is hampered or prevented. A transparent protective layer which prevents the adherence of dirt to the transparent elements and/or the binder layer may in this case be provided as a coating. Furthermore, changes due to external influences may thus be prevented. It may be additionally provided that the coating has a lotus effect, thus preventing the adherence of dirt. The accumulation of condensation water or the adherence of ice and snow may also impede the reflective function of the body. For example, a coating may be configured so as to prevent the adherence of condensation water and/or ice and snow. Additionally or separately, it may further be provided that a coating is substantially smooth towards the incidence of light and simplifies cleaning the retro-reflective body.

It is preferred that the coating has a thickness in the range from 5 µm to 200 µm, particularly preferably in the range from 10 to 50 µm.

In another embodiment of the retro-reflective body, the optically perceptible feature is configured as a character and/or as an emblem and/or as a digit and/or as a pattern.

In another embodiment, it is preferred that the transparent elements have dimensions in the range from 25 to 100 µm, particularly preferably in the range from 30 to 70 µm, and in particular 50 µm.

In another embodiment, it is preferred that the binder layer has a thickness of 60 to 250 µm, particularly preferably of 60 to 120 µm.

In another preferred embodiment, it is provided that the retro-reflective body is configured as a film. Further, it is preferred that the film is configured as a strip-shaped material. In this case, the strip-shaped material may be capable of being rolled up.

In another embodiment, the retro-reflective body is configured as a traffic sign or vehicle number plate.

In another embodiment, the retro-reflective body has a legend, e.g. with digits and/or characters, in particular letters. It is particularly preferable in this case that the legend is configured in a relief-like or plastic manner. Furthermore, the legend may be embossed into the body and have raised portions. The raised portions are preferably colored. For example, a thermal transfer process may be provided for coloring, wherein the raised portions are colored by paint transfer from a color substrate film.

In another embodiment, it may be provided that the reflective body is configured as a strip. In this case, it is particularly preferred that the strip can be rolled up. It may also be provided that panel plates can be punched out of the strip. In this case, the metal may include metal. For example, the strip may have a substrate formed from metal, such as aluminum, for example.

Surprisingly, it was found that, when a retro-reflective film with a structure comprising transparent sphered embedded in a binder layer is lasered, this results in special color effects in the lasered regions when illuminated obliquely. Further, it was found that, subsequent to lasering, gaps are formed between the spheres and the binder layer in the lasered areas.

For this purpose, a prior-art film from the manufacturer 3M of the type "Scotchlite™4750 Oralite® 5100" was exposed to a high power density pulsed laser within a first partial region. In this case, this film was lasered with two different lasers. In both cases, the above mentioned reflection effects arose within the lasered first partial region, with colors that did not appear in the non-lasered and untreated regions of the film.

A first sample was lasered with a picosecond laser with a wavelength of 1030 nm with the following settings:

Write speed: 2000-10000 mm/s

Power: 5-100% average power, with an average power of approx. 10 W

Pulse sequence frequency: in the range of 1 MHz

Pulse width: in the range from a few to a few tens of picoseconds

Defocusing: optionally possible

A second sample was also lasered with a nanosecond laser with a wavelength of 1064 nm with the following settings:

Write speed: 100-1000 mm/s

Power: 5-100% average power, with an average power of approx. 20 W

Pulse sequence frequency: 2 to 60 kHz

Pulse width: in the nanosecond range

Defocusing: optionally possible with 35 to 120 mm

In each case, one partial region of the film samples was lasered.

Both samples of the lasered film exhibit a pronounced optically perceptible effect, in each case in the lasered regions. This optically perceptible effect takes the form that the lasered regions exhibit color effects that did not arise in the non-lasered regions and in non-lasered films. Furthermore, the films exhibited low to no retro-reflectivity in the lasered regions. The color effects are perceptible if illuminated with oblique light, wherein the angle of illumination is unequal to the viewing angle.

An examination of the samples subsequent to lasering shows that, within the lasered regions with the strong optically perceptible color effects, the binder layer has become partially detached from the spheres, so that a gap is present between the sphere and the binder layer.

The treatment of the above-mentioned film by means of the aforementioned pulsed high power density lasers presumably results in a melting of the binder layer, and thus in an ablation or separation of the polymer from the spheres. Presumably, the material contracts when it cools off, and a gap between the sphere and the binder layer is produced. The optically perceptible effect that then occurs under oblique illumination is presumably the result of light refraction. At the transition of the transparent spheres, presumably, the light refraction results in a spectral decomposition of the light into different wavelengths, similar to a prism. At the interface of the transparent spheres with the gaps, light is presumably reflected totally and then reflected back to the observer. This presumably gives rise to a color effect due to the previous spectral decomposition of the light into the various color beams.

Both the lasered film with the occurring color effect and the untreated film known from the prior art were broken by means of cold cracking and examined. In this regard, reference is made to the description of the FIGS. 2 to 11 further below. The examination showed that, in the film in which the colored reflective effect arose, the number of glass spheres at which an air gap occurs corresponds to about 10 to 90% of the spheres located within the lasered contour. In the non-lasered regions of the film samples that do not exhibit any special color effect, no gap formation on the spheres as described above occurred.

In addition to as well as separately from the retro-reflective body with an optically perceptible feature, a method for producing a retro-reflective body with an optically perceptible feature is proposed in accordance with another idea of the disclosure. The method comprises at least the following steps:

Providing a substrate on whose upper side a binder layer is disposed, wherein a plurality of transparent elements is at least partially embedded into the binder layer in such a way that light can enter the transparent elements, wherein the surface of the transparent elements is configured as a spherical segment at least in some portions and wherein the spherical segments of the transparent elements are embedded into the binder layer and are orientated towards the upper side of the substrate, Application of a laser radiation to a first partial region of the retro-reflective body.

In the process, in the first partial region, spaces are formed at least partially between the binder layer and the spherical segments in a first share of the transparent elements. In this case, the spaces are filled with an optically considerably thinner medium than the transparent elements, such as gas, in particular ambient air, or a vacuum. In this case, the optically perceptible feature is formed by the partial region.

In this case, "optically thinner" relates to the material of the transparent elements.

In another embodiment of the method, the first share of transparent elements with a space formation is 10 to 90%. In another preferred embodiment of the method, the first share of transparent elements with a space formation is 10 to 50%. In particularly preferred embodiment of the method, the first share of transparent elements with a space formation is 20 to 30%.

In another embodiment, the substrate has a second partial region, in which, in a second share of the transparent elements, spaces are formed at least partially between the binder layer and the spherical segments that are filled with an optically thinner medium or a vacuum. In this case, the second share is at most 50% of the first share, preferably at most 30% and particularly preferably at most 15%.

In another preferred embodiment of the method, the spaces are in each case formed as a gap between the transparent elements and the binder layer.

In another embodiment of the method, the radiation is a laser radiation whose wavelength is preferably in the visible, near infrared or near ultraviolet range.

Further, it is preferred that the laser radiation is pulsed, wherein a pulse duration is preferably in the range of a few picoseconds (ps), particularly preferably in the range of less than 100 ps, and particularly preferably less than one picosecond.

Furthermore, it is preferred that the binder layer is melted temporarily. It may also be provided that the transparent elements heat up and thus expand. Presumably, the binder layer is thus displaced.

Furthermore, it is preferred that the radiation directed onto the retro-reflective body is focused. In this case, it is particularly preferred that the focus is located above or below the binder layer. In this case, the focus of the radiation is spaced apart from the upper side of the binder layer by at least 10 mm, preferably at least 20 mm, and particularly preferably at least 30 mm. In this context, the upper side of the binder layer is the side of the binder layer facing away from the substrate.

It is provided in another embodiment that the first region is scanned by means of a radiation beam. It is also possible that the first region is hatched with a radiation beam, i.e. that the radiation is applied to the film in parallel lines. Furthermore, it may in this case also be provided that the retro-reflective body is covered by means of a template that leaves the first partial region exposed. In this case, it is preferred that the radiation incident on the retro-reflective body covers the entire first region.

In addition or separately, according to another idea of the disclosure, the use of a retro-reflective body according to the above description as a vehicle number plate and/or traffic sign is proposed. In this case, it is preferred that the retro-reflective body is configured in the form of a sign.

Additionally or separately, a method for producing a vehicle number plate and/or a traffic sign is also provided according to the disclosure, which comprises the step that a retro-reflective body according to the above description is laminated in the form of a film onto a plate panel.

In this context, a plate panel is to be understood to be a blank acting as the basis for a sign. The blank does not yet include a coating that acts retro-reflectively and comprises the optically perceptible feature. These functions can be obtained by a retro-reflective film with the optically perceptible feature according to the above description being applied to the panel blank as a coating.

BRIEF DESCRIPTION OF THE DRAWINGS

Other advantageous embodiments and developments are specified in the following Figures. However, the respective features that are apparent therefrom are not limited to individual Figures or embodiments. Rather, one or several features of the above description can be additionally combined with individual or several features of the Figures to constitute developments.

In the figures.

DETAILED DESCRIPTION OF THE DRAWINGS

Figure 1:
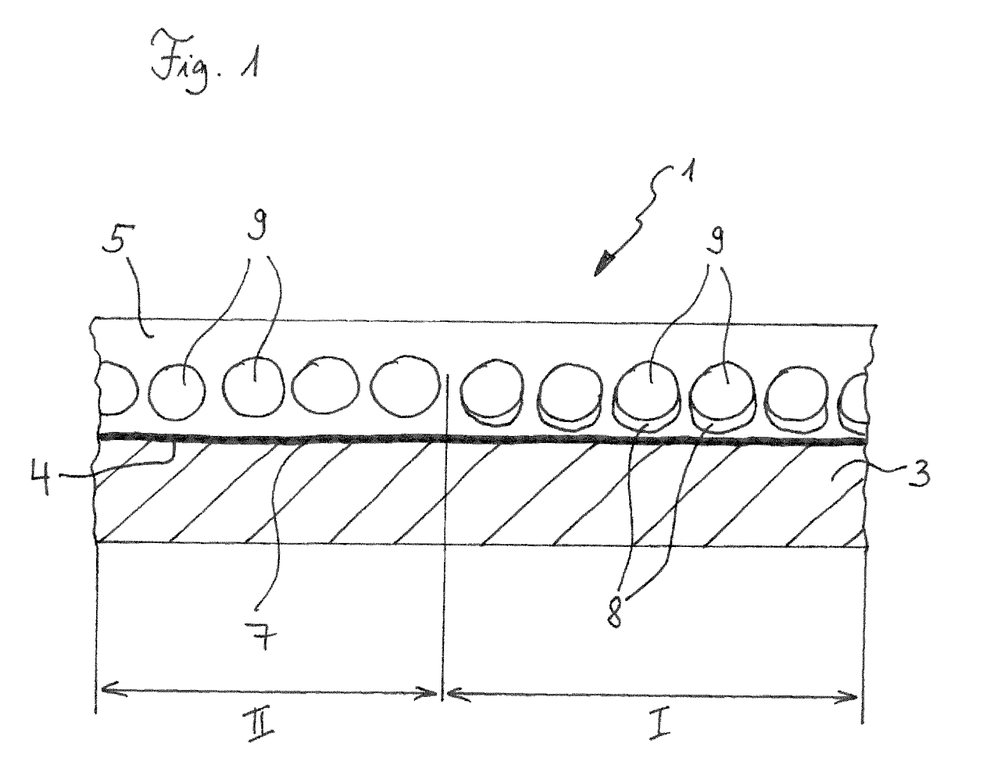
FIG. 1: shows a retro-reflective body according to the disclosure.

FIG. 1 shows the schematic view of a preferred exemplary embodiment of a retro-reflective body 1. The retro-reflective body 1 has a substrate 3 on whose upper side 4 a binder layer 5 is applied into which transparent spheres 9 are incorporated. A reflective layer 7 is disposed between the substrate 3 and the binder layer 5. The section of a retro-reflective body shown here schematically has two partial regions I and II. Within the first partial region I, transparent spheres 9 are embedded into the binder layer in such a way that sections of the spheres orientated towards the upper side 4 of the substrate are adjacent to gaps 8 in some portions. These gaps 8 are filled with an optically thinner medium than the material of the transparent spheres. The retro-reflective body also has a second partial region II. In this partial region, the transparent spheres disposed here in the binder layer do not exhibit gap formation. However, it is possible that individual transparent spheres also exhibit gap formation in the further course of the second partial region II. The number of the transparent spheres with gap formation exceeds by far the number of transparent spheres with gap formation in the second region. For the first partial region I, it is preferred that a first share of 10 to 90% of the transparent spheres exhibit gap formation, it is particularly preferred that 10 to 50% of the transparent spheres exhibit gap formation, and it is more particularly preferred that a first share of 20 to 30% of the transparent spheres exhibit gap formation. It is possible also in the second partial region that individual transparent spheres exhibit gap formation. It is preferred that, in the second partial region II, a second share is at most 50% of the first share in the first partial region, preferably at most 30% and more particularly preferably at most 15%. Preferably, the reflective layer in the first partial region I has a reduced retro-reflectivity to no retro-reflectivity compared with the second region II.

The following FIGS. 2 to 8 show samples of a film treated with the method according to the disclosure. For this purpose, the film 10 was exposed to a laser beam. The basis for the application of the laser was a glass sphere-based retro-reflective film 10, 10* as it is known from vehicle number plates. Specifically, the film type "3M Scotchlite™ 4750 Oralite® 5100" was used in this case. The treatment was carried out with a high power density pulsed laser. Specifically, two different lasers were used:

a. Picosecond laser with a wavelength of 1030 nm
Settings:
Write speed: 2000-10000 mm/s
Power: 5-100% average power, with an average power of approx. 10 W
Pulse sequence frequency: in the range of 1 MHz
Pulse width: in the range from a few to a few tens of picoseconds
Defocusing: optionally possible b. Nanosecond laser with a wavelength of 1064 nm
Settings:
Write speed: 100-1000 mm/s
Power: 5-100% average power, with an average power of approx. 20 W
Pulse sequence frequency: 2 to 60 kHz
Pulse width: in the range from a few to a few tens of nanoseconds
Defocusing: optionally possible with 35 to 120 mm In the case of lasering with the picosecond laser, more pronounced color effects were obtained than in the lasering with the nanosecond laser.

The samples were cooled down to a temperature of down to minus 196° C. using nitrogen, whereby the material became solid and could thus be broken, similar to a glass pane. Due to the very small dimensions of the glass spheres, no cracks through the glass spheres could be achieved. However, the method used was very effective for other film layers and achieved cracks in which the cross sections of the reflective film are very easily recognizable. In order to avoid charging from the electron beam during electron microscopy process, a thin layer of gold of about 30 nm was applied to the respective cross sections by sputtering. Using a conductive adhesive tape, the samples were then connected with a grounded sample holder, so that the charge carriers could be quickly transported away.

In the following FIGS. 2 to 11, samples are shown as microscopic cross sections. In this case, FIGS. 2 to 8 represent a retro-reflective film 10, 10* from the manufacturer 3M of the type "3M Scotchlite™ 4750 Oralite® 5100", to which one of the above laserings was applied. These samples exhibit color effects in the lasered regions.

Figure 9:
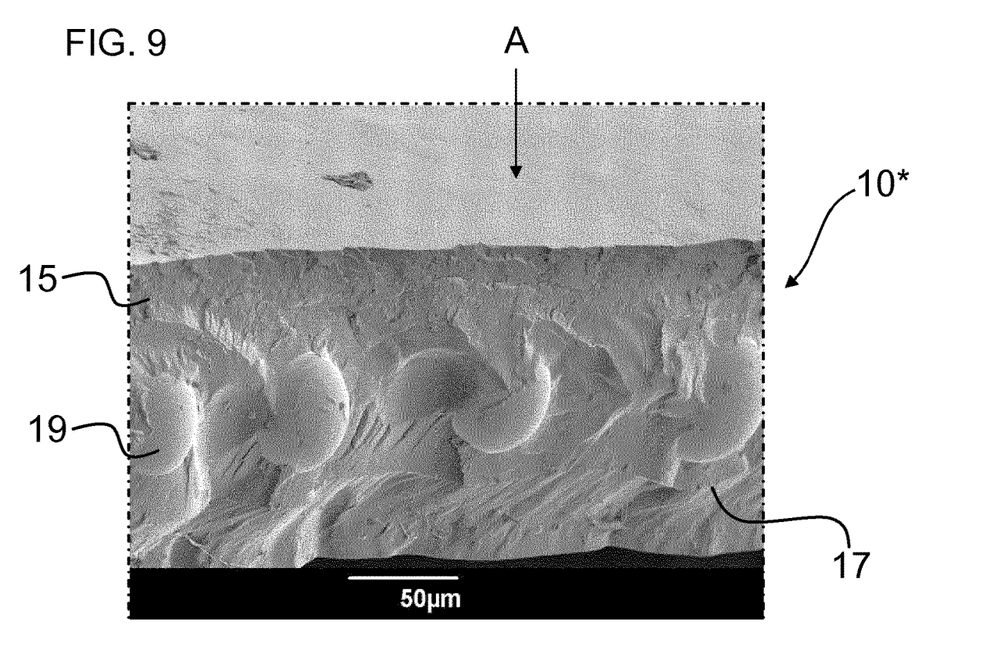
FIGS. 9 to 11: show electron-microscopic cross-sections of a prior-art film.
Figure 10:
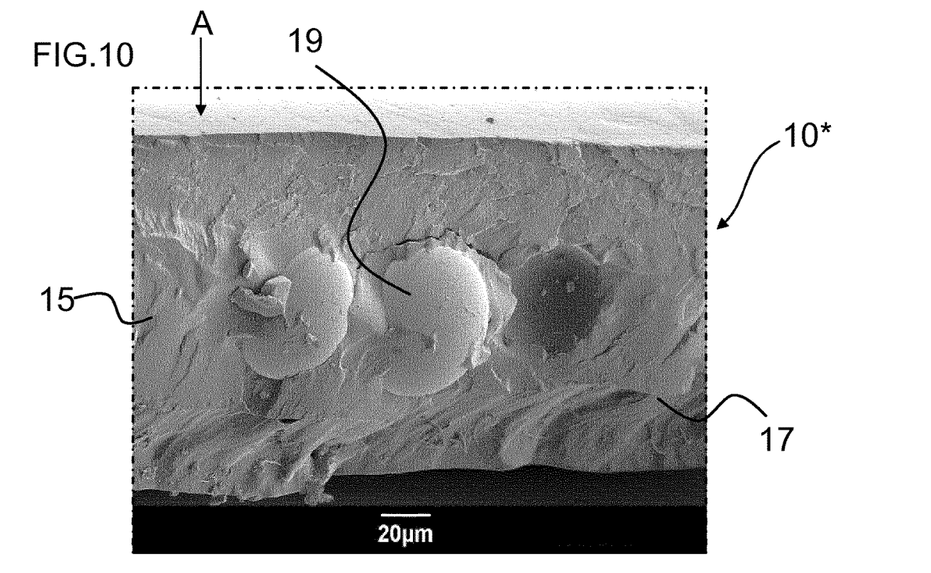
Figure 11:
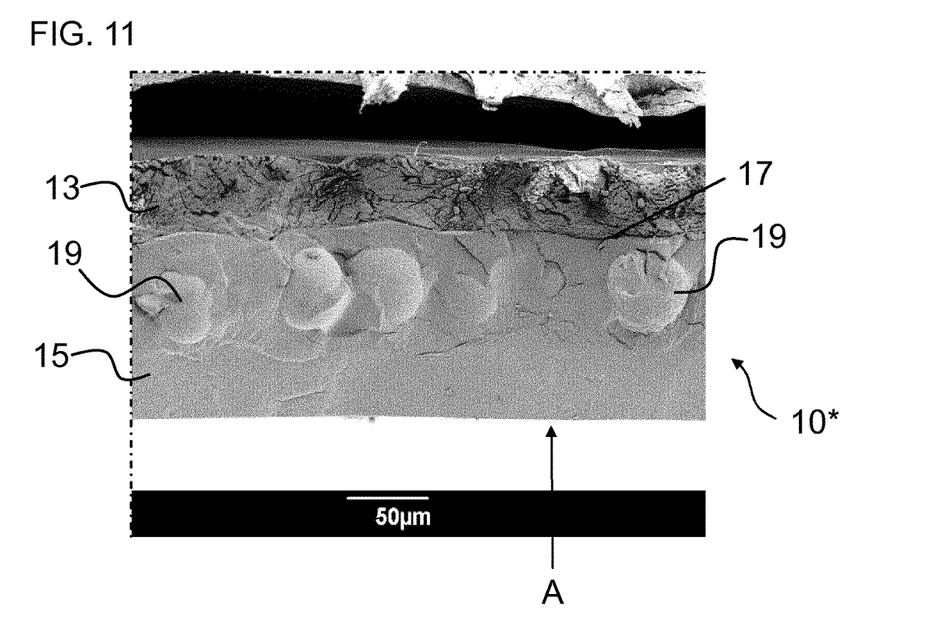

FIGS. 9 to 11 depict samples in the electron-microscopic cross section of the above-mentioned film, which was not treated. In this case, the prior-art film is shown in various views.

From these illustrations, it is apparent that the treated samples all exhibit a detachment of the binder layer from the glass spheres in the lasered regions, which results in a space between the sphere and the binder layer.

The untreated film, as is shown in FIGS. 9 to 11, does not exhibit any detachment of the binder layer from the glass sphere. In this sample, the glass spheres are fully embedded into the binder layer.

In the following Figures, the surface of the film in the direction of illumination is uniformly denoted by the letter A, the film treated with the method according to the disclosure is denoted with 10, the untreated film with 10*, the binder layer with 15, the glass sphere with 19, impressions of the glass sphere with 14, gaps between the binder layer and the sphere with 18, the reflective layer with 17, and the substrate with 13.

Figure 2:
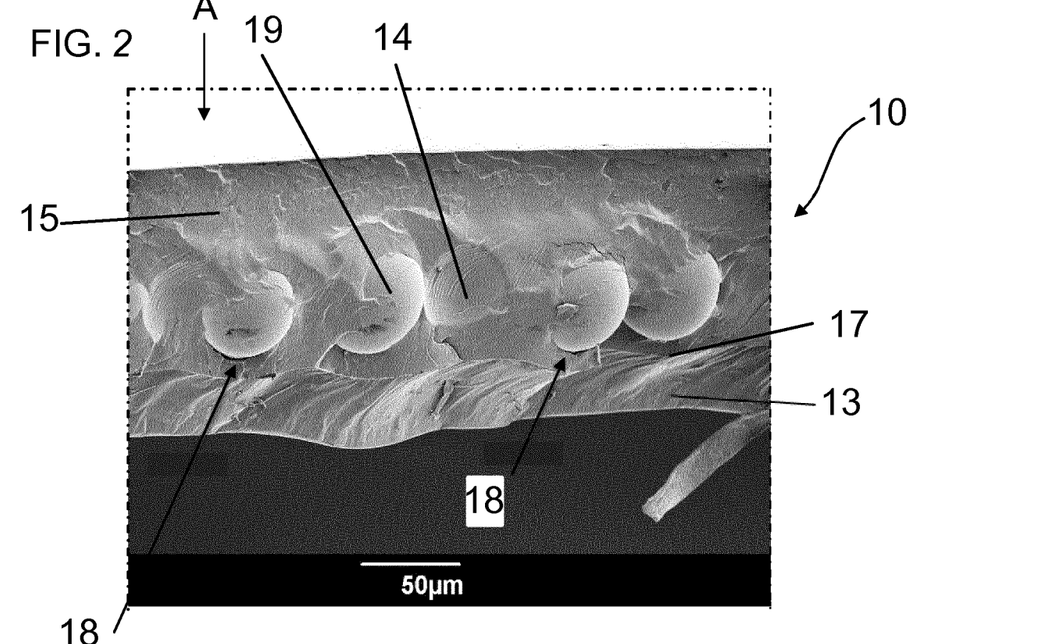
FIGS. 2 to 8: show electron-microscopic cross-sections of a film according to the disclosure.

FIG. 2 shows the electron-microscopic cross section through a film 10 treated with the method according to the disclosure. Here, the glass spheres 19 are fully embedded in a binder layer 15. In this case, the binder layer 15 with the spheres is disposed on a substrate layer 13. At the edge of the crack, the glass spheres 19 mostly protrude from the binder layer 15. In some places, only impressions 14 within the binder layer 15 remain because individual glass spheres 19 drop out of the binder layer 15 during cold cracking. In this sample, the glass spheres 19 have a diameter of about 50 μm. A reflective layer 17, which completely covers the binder layer 15, is located underneath the binder layer 15. The side of the binder layer 15 facing away from the reflective layer 17 forms the front A of the film 10. The sample in the view exhibits gaps 18 between the spheres 19 and the binder layer 15.

Figure 3:
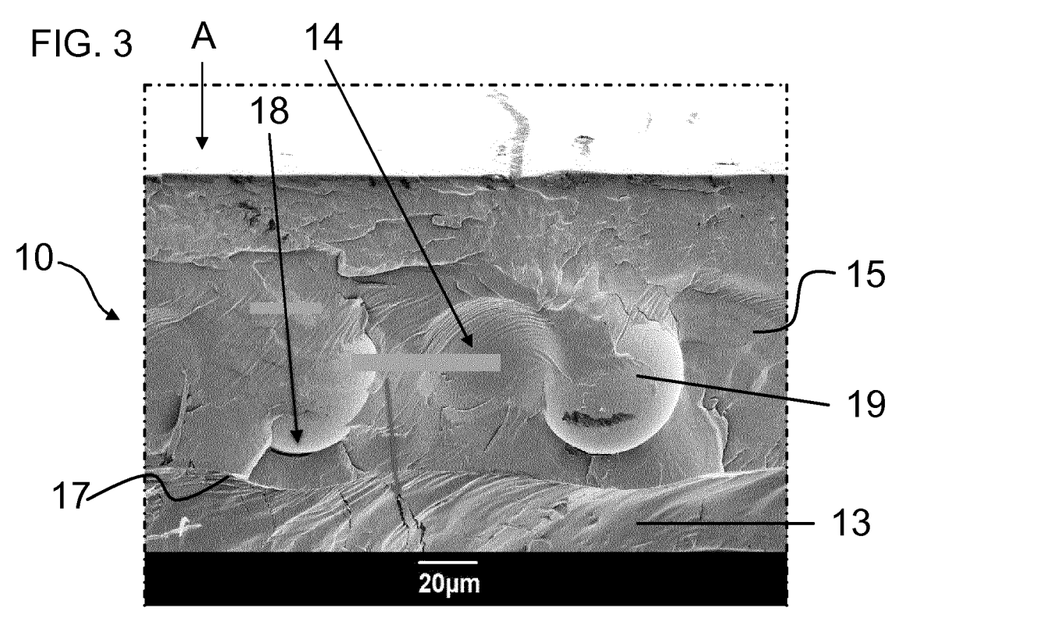
Figure 4:
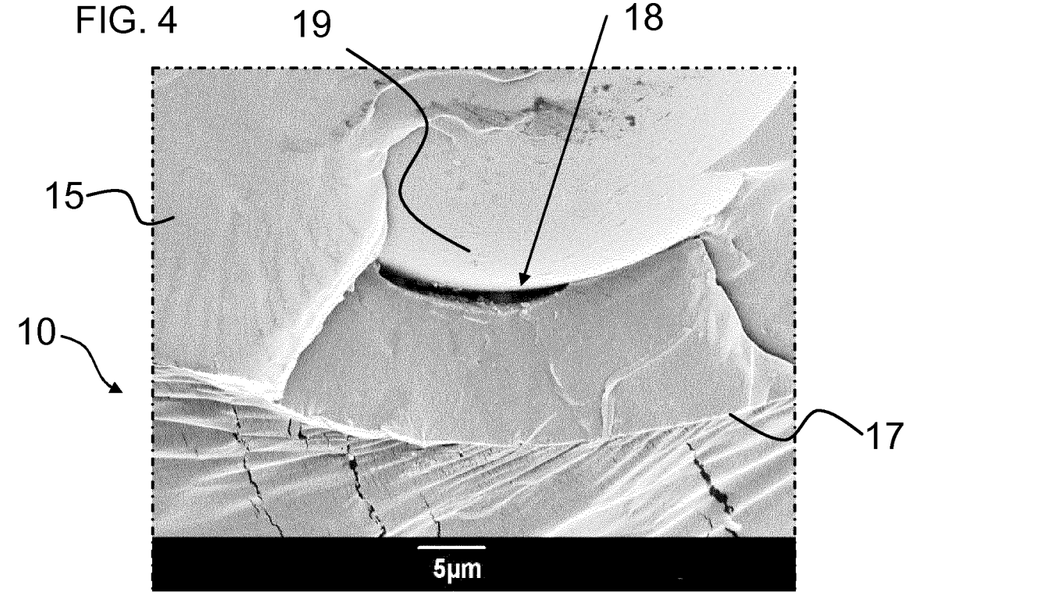

FIGS. 3 and 4 show an enlargement of the film from FIG. 2. The gap 18 approximately has a length of 10 μm.

Figure 5:
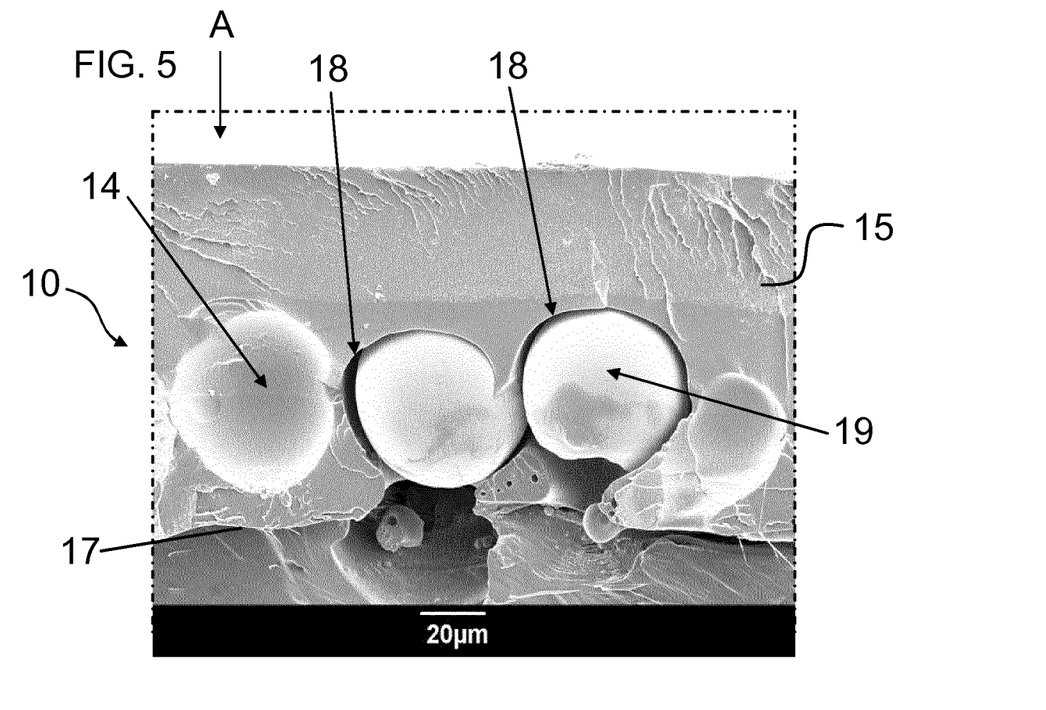

Another retro-reflective film 10 that was treated with the above-mentioned laser is shown in FIG. 5. The glass spheres 19 exhibit a pronounced delamination of the binder layer 15 and form a gap 18 between the binder layer 15 and the glass sphere 19. In this sample, this gap 18 even extends around a major part of the individual glass spheres 19. By applying laser radiation to the retro-reflective film 10, the binder layer 15 presumably became partially detached from the sphere 19 and the formation of the gap 18 occurred.

In this sample of FIG. 5, if illuminated obliquely, a pronounced optical effect in the form of colored rings occurs within the sphere. Here, each individual ring contains the entire spectrum from blue to red. Another color effect in the form of luminous circles around the sphere also occurs outside the spheres.

Figure 6:
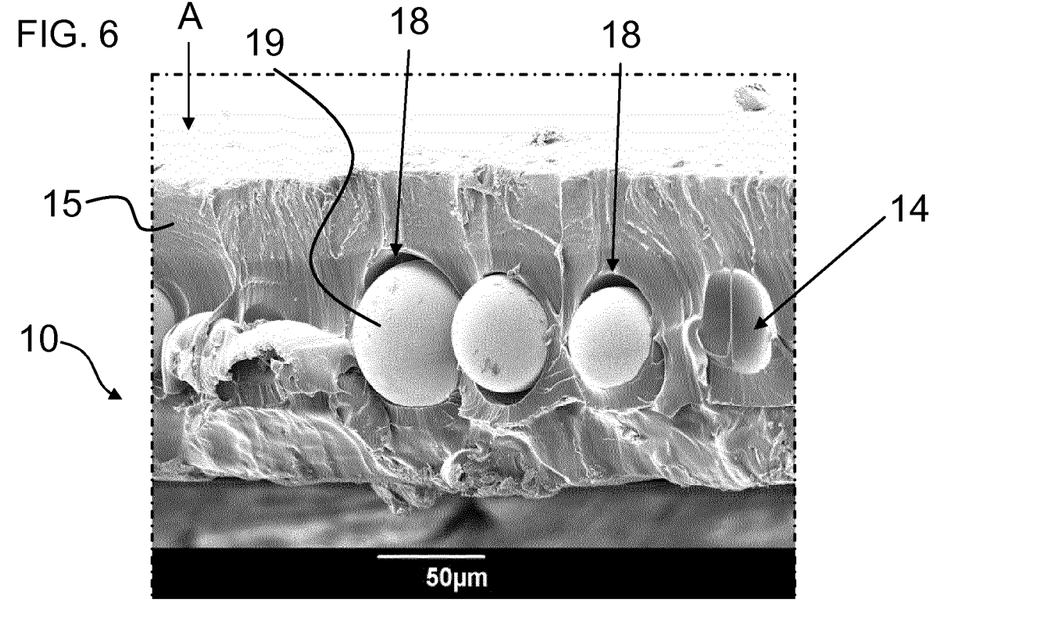
Figure 7:
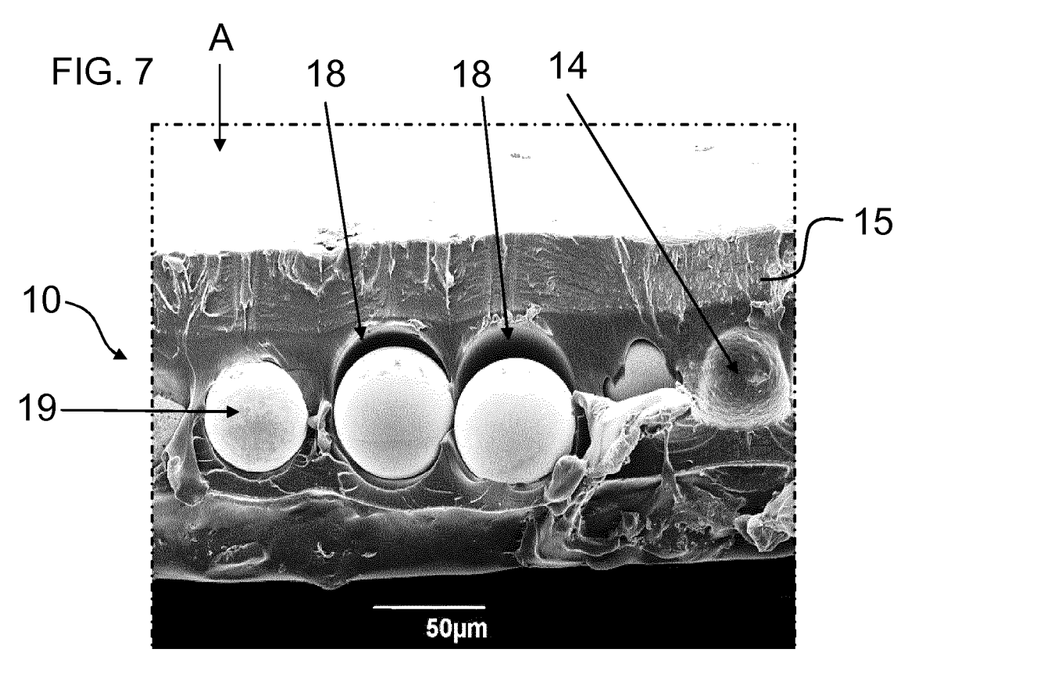
Figure 8:
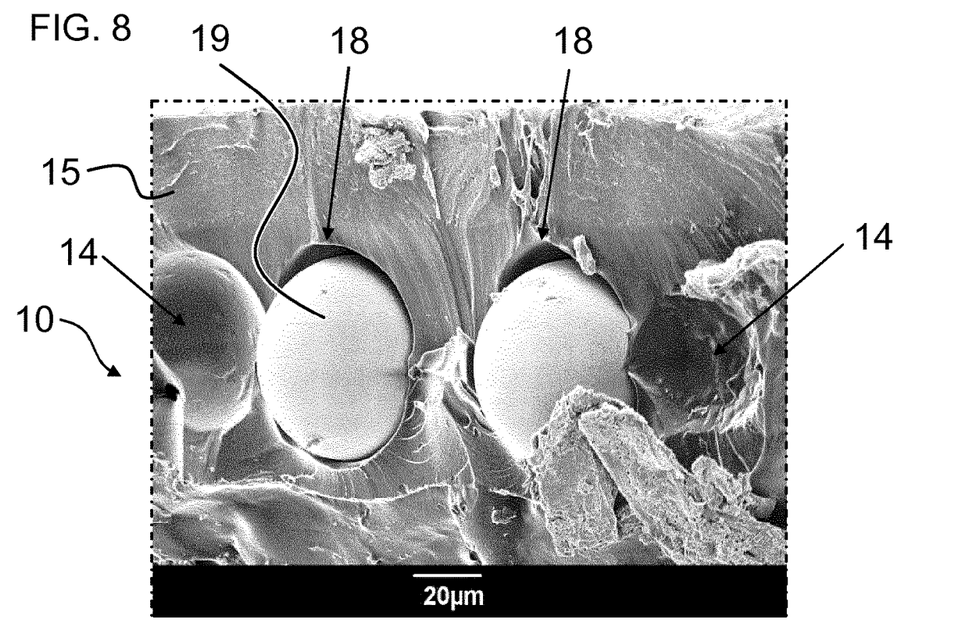

FIGS. 6 to 8 show further images of samples that were treated in accordance with the disclosure with the above-described laser method. These samples also exhibit gaps 18 or a detachment of the binder layer 15 from the spheres 19 and, if illuminated, the color effects described with respect to FIG. 5.

In comparison, FIG. 9 shows the electron-microscopic cross section through an untreated retro-reflective film 10* from the prior art. Untreated means that this film 10* was not treated with the above-mentioned laser method and does not exhibit the color effects described above. Furthermore, this sample also does not exhibit any gaps or detachment of the binder layer 15 from the spheres 19. The binder layer 15 comprises a polymer into which the individual glass spheres 19 are fully embedded. At the edge of the crack, the glass spheres 19 at least partially protrude from the binder layer 15. In some places, impressions 14 in the binder layer 15 remain where individual glass spheres have dropped out during cold cracking. This film 10* has spheres 19 with a diameter of about 50 μm, which are fully embedded in the binder layer.

FIG. 10 shows a section of the film 10* described in FIG. 9, which shows a greater enlargement thereof.

FIG. 11 shows another sample of an untreated film 10*, which is rotated by 180° relative to the sample from FIG. 9. In this view, the binder layer 15 is now located in a downward direction towards the side of the page, while accordingly, the reflective layer 17 also faces downwards towards the side of the page. The front side A of the film 1 now faces downwards to the side of the page. The untreated film 10* shown in the FIGS. 9 to 11 has spheres 19 that are fully embedded in the binder layer 15. In this case, it does not exhibit the color effect described above if illuminated obliquely.

The invention claimed is:

1. A retro-reflective body with an optically perceptible feature, comprising a substrate on whose upper side a binder layer is disposed, wherein a plurality of transparent elements is at least partially embedded into the binder layer such that light can enter the transparent elements, wherein the surface of the transparent elements is configured as a spherical segment at least in some portions and wherein the spherical segments of the transparent elements are embedded into the binder layer and are orientated towards the upper side of the substrate, the retro-reflective body has a first partial region in which a first share of the transparent elements, in each case with the spherical sections, is adjacent to gas-filled or vacuum-filled spaces at least in some portions, and the gas-filled or vacuum-filled spaces are formed between the transparent elements and the binder layer, wherein the optically perceptible feature is formed by the first partial region,
wherein
the retro-reflective body is configured as a film,
wherein the film is lasered in the first partial region such that the gas-filled or vacuum-filled spaces are each configured as a gap substantially surrounding or encircling the transparent elements.

2. The retro-reflective body according to claim 1, wherein the first share is 10% to 90%.

3. The retro-reflective body according to claim 1, wherein the first share is 10% to 50%.

4. The retro-reflective body according to claim 1, wherein the first share is 20% to 30%.

5. The retro-reflective body according to claim 1, comprising a second partial region in which a second share of the transparent elements, at the spherical segments, is adjacent at least in some portions to a space filled with an optically thinner medium or a vacuum, wherein the second share is at most 50% of the first share.

6. The retro-reflective body according to claim 1, wherein a reflective layer, to which the binder layer is adjacent, is disposed on the upper side of the substrate, wherein the binder layer is configured to be substantially transparent.

7. The retro-reflective body according to claim 6, wherein the reflective layer has a thin metallic layer.

8. The retro-reflective body according to claim 1, wherein the transparent elements are configured for light refraction, so that light entering the transparent elements obliquely undergoes spectral decomposition.

9. The retro-reflective body according to claim 1, wherein the transparent elements are arranged next to one another substantially in a plane parallel to the upper side of the substrate.

10. The retro-reflective body according to claim 1, wherein the transparent elements are substantially configured as spheres.

11. The retro-reflective body according to claim 1, wherein the optically perceptible feature is configured as a character, an emblem, a digit, or a pattern.

12. The retro-reflective body according to claim 1, wherein the transparent elements have dimensions in the range from 25 to 100 μm.

13. The retro-reflective body according to claim 1, wherein the binder layer has a thickness in the range from 60 to 250 μm.

14. The retro-reflective body according to claim 1, wherein the retro-reflective body is configured as a traffic sign or a vehicle number plate.

15. A method for producing a vehicle number plate and/or a traffic sign, comprising the step of the retro-reflective body configured as a film according to claim 1 being laminated onto a panel blank.

16. A method for producing a retro-reflective body according to claim 1 with an optically perceptible feature, the method including at least the following steps:
a. providing a substrate on whose upper side a binder layer is disposed, wherein a plurality of transparent elements is at least partially embedded into the binder layer such that light can enter the transparent elements, wherein the surface of the transparent elements is configured as a spherical segment at least in some portions and wherein the spherical segments of the transparent elements are embedded into the binder layer and are orientated towards the upper side of the substrate, and b. applying a laser radiation to a first partial region of the retro-reflective body wherein the laser radiation is applied such that, in the first partial region, gas-filled or vacuum-filled spaces are formed at least partially between the binder layer and the spherical segments in a first share of the transparent elements, whereby the optically perceptible feature is formed by the first partial region.

17. The method according to claim 16, wherein the first share is 10% to 90%.

18. The method according to claim 16, wherein the first share is 10% to 50%.

19. The method according to claim 16, wherein the first share is 20% to 30%.

20. The method according to claim 16, wherein the substrate has a second region in which spaces filled with an optically thinner medium or with a vacuum are formed at least partially between the binder layer and the spherical segments in a second share of the transparent elements, and wherein the second share is at most 50% of the first share.

21. The method according to claim 16, wherein the spaces are in each case formed as a gap between the transparent elements and the binder layer.

22. The method according to claim 16, wherein the wavelength of the laser radiation is in the visible, near infrared, or near ultraviolet range.

23. The method according to claim 16, wherein the laser radiation is pulsed, wherein a pulse duration is in the range of a few hundred picoseconds.

24. The method according to claim 16, wherein the binder layer is melted temporarily.

25. The method according to claim 16, wherein the radiation directed onto the retro-reflective body is focused.

26. The method according to claim 25, wherein the focus is located above or below the binder layer.

27. The method according to claim 26, wherein a focus of the radiation is spaced apart from the binder layer by at least 10 millimeters.

28. The method according to claim 16, wherein the first partial region is scanned by means of a radiation beam.

29. The method according to claim 16, wherein the retro-reflective body is covered by means of a template that leaves the first partial region exposed.

30. The method according to claim 16, wherein the radiation incident on the retro-reflective body covers the entire first partial region.

* * * * *